United States Patent [19]
Prochnow

[11] Patent Number: 5,593,061
[45] Date of Patent: Jan. 14, 1997

[54] FISHING TACKLE STORAGE AND CARRYING APPARATUS

[76] Inventor: Neal Prochnow, N7971 980th St., River Falls, Wis. 54022

[21] Appl. No.: 542,668

[22] Filed: Oct. 13, 1995

[51] Int. Cl.⁶ ....................................... B65D 1/24
[52] U.S. Cl. ............... 220/507; 43/57.1; 206/315.11; 220/505; 220/524; 220/770
[58] Field of Search ............... 206/315.11; 43/57.1, 43/54.1, 55, 56, 57.3; 220/505, 507, 524, 526, 553, 555, 756, 770, 212.5

[56] References Cited

U.S. PATENT DOCUMENTS

| | | | |
|---|---|---|---|
| 478,103 | 7/1892 | Hahn et al. | 220/770 |
| 2,447,105 | 8/1948 | Vogel | 43/57.1 |
| 2,683,642 | 7/1954 | Stoleson | 206/315.11 |
| 3,182,872 | 5/1965 | Brosseau | 43/57.1 |
| 3,610,461 | 10/1971 | Allyn | 220/770 |
| 4,023,304 | 5/1977 | Singer | 43/54.1 |
| 4,589,546 | 5/1986 | Sunderland | 220/212.5 |
| 4,729,474 | 3/1988 | Lanius et al. | 206/315.11 |
| 5,305,544 | 4/1994 | Testa, Jr. | 206/315.11 |

Primary Examiner—Stephen J. Castellano
Attorney, Agent, or Firm—Joel D. Skinner, Jr.

[57] ABSTRACT

A fishing tackle storage and carrying apparatus, comprising a unitary, rectilinear body having a bottom wall and a plurality of interconnected side walls connected to and extending vertically from the bottom. The sides defining an interior reservoir bounded by the bottom and the sides. The apparatus also comprises a plurality of compartments disposed outside the body. The compartments are formed by an outer wall disposed a predetermined distance from at least one side wall and a plurality of divider walls connected to and extending between at least one side wall and the outer wall. The side walls are spaced parallel a predetermined distance from each other.

15 Claims, 3 Drawing Sheets

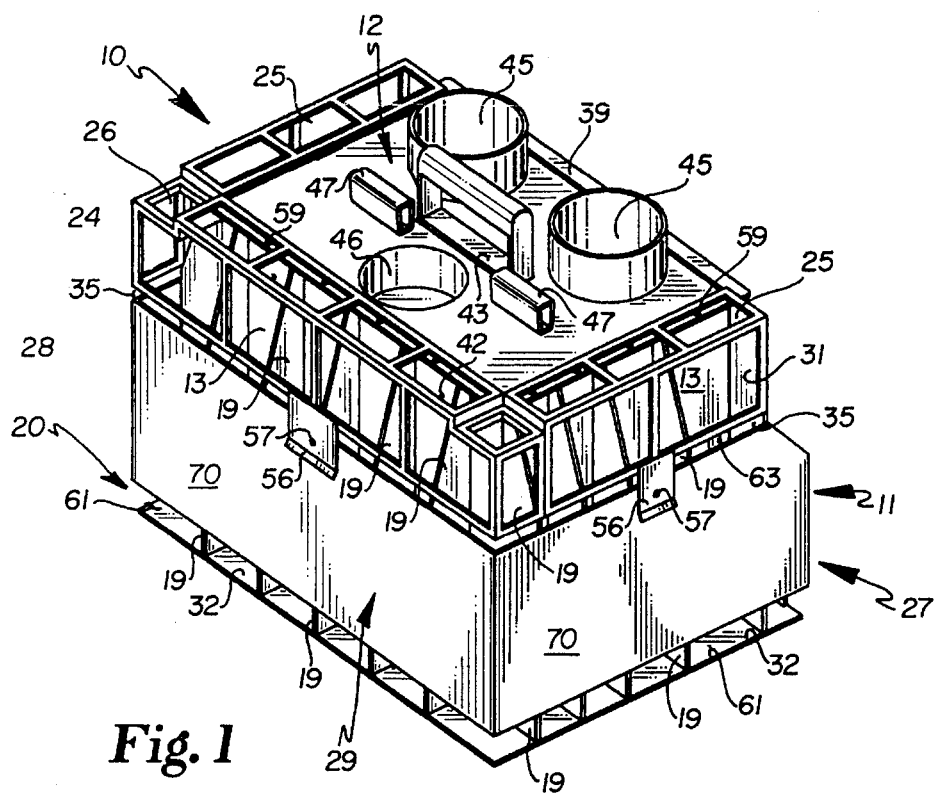
Fig. 1
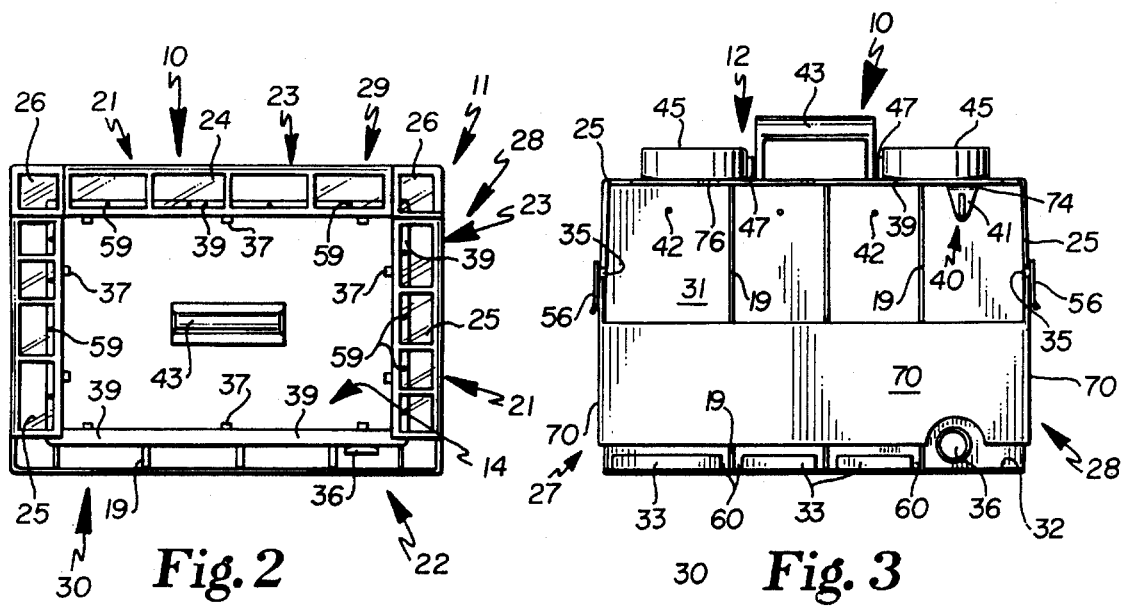
Fig. 2
Fig. 3

FISHING TACKLE STORAGE AND CARRYING APPARATUS

BACKGROUND OF THE INVENTION

1. Field of the Invention

This invention relates to storage containers in general and, more specifically, to storage containers for fishing tackle. The invention is particularly useful for storing, carrying and easy access to large, artificial fishing lures, fishing accessories, beverages and or live bait. The present invention combines all of these functions into a single compact unit that saves valuable boat space and speeds the process of retrieving and of changing fishing lures.

2. Background Information

Various tackle carrying and storage boxes have been designed to store fishing tackle and lures with the evolution of the designs tending to be from simple, reasonably sized boxes to large boxes with numerous and complex compartments. The large, complex designs of the current storage boxes are appropriate for storage of fishing tackle and lures but their complex nature renders them impractical for use while fishing. This is particularly true when several individuals share space in a typical fishing boat and are casting their fishing lines.

A variety of useful multi-compartment fishing tackle storage units exist. These storage units usually contain several trays and tiers that, when fully opened, form an inverted series of stair-step like levels which can expand from at least two sides of the storage unit. Some other existing tackle storage units combine a live bait chamber with various other compartments to store tackle while the unit is being transported.

In order to have an easy way to store and retrieve lures while casting, many individuals utilize a Styrofoam minnow bucket to hold their lures. The Styrofoam plastic composition of such minnow buckets is suitable for the attachment of the barbed point of the hook end of a large lure to the open top edge of the structure. The lures, attached in this manner, hang vertically from the top edge on the inside or outside of the Styrofoam bucket. However, this approach to storage and use of fishing tackle and lures is awkward, unsafe and unsuitable for several reasons.

While the use of Styrofoam minnow buckets to hold and transport fishing lures solves the immediate problem of easy access to the tackle and lures, the material and inverted design of the Styrofoam minnow buckets causes them to be unstable. The tall, narrow design of a Styrofoam bucket, with the widest dimension being at the top, causes the bucket to tip over when a boat starts and stops or when there are large waves or other rough water conditions. This can cause spills and possibly cause the lures to become tangled. To provide stability to a Styrofoam bucket, weight such as a rock or brick is often placed in the bottom. The added weight creates stress from the inside of the container causing it to breakdown.

The handles on a Styrofoam bucket are typically made of braided cord which can also become tangled in the hook end of the lures. Furthermore, a barbed hook accelerates the breakdown of the edges of the bucket. The Styrofoam buckets detachable lid is of no use when the lures are attached to the top edge of the bucket. It is often inappropriately discarded of or can be blown away by wind creating an environmental hazard.

Insofar as is known, no system has been developed or proposed which has solved the problem of easy safe storage and access to fishing tackle and large lures, such as muskie or northern pike lures, utilized in casting. The present invention is specifically directed to overcoming all of the problems previously enumerated regarding the performance of the tackle storage containers currently in use.

SUMMARY OF THE INVENTION

The present invention provides a unitary and compact carrying device that is particularly suited for safe storage, easy access to and the use of fishing lures and accessories, particularly large lures. In addition, the following objects and advantages of this invention are.

a) To minimize or eliminate the possibility of injury to the user, other individuals or pets that could result from swinging hooks by use of a rectilinear design and hinged, clear plastic compartment covers.

b) To provide sturdy, permanent storage compartments that are compatible with a movable hook system.

c) To easily view stored tackle and accessories.

d) To protect the environment. Instead of materials or parts that could damage or litter the environment, this carrying device is constructed of molded plastic with no loose parts to blow away.

e) To store lures and tackle vertically in compartments that will allow air flow. Instead of placing lures and tackle in drawers or trays where they can become entangled and remain wet in pooled water, accessories are hung in permanent compartments with open airflow space at the top, middle and bottom of each pocket.

f) To make this carrying device compatible for either large (i.e. muskie, northern) or small (i.e. walleye, bass) fishing by including two different sized hooks on which to hang lures and other accessories.

g) To provide a device where in a central reservoir can hold bottled or canned beverages, ice and/or live bait in plastic containers. The reservoir's one inch drain hole located near the floor of the central reservoir allows for minnows and water to be drained away without having to tip the carrying device to pour the water out and thus disturb the vertically stored fishing accessories, etc. The central reservoir also provides a way to contain trash that could pollute the environment.

h) To provide a place to hold opened beverage containers so that they are not easily spilled.

These and other benefits of the invention will become clear from the following description by reference to the drawings.

BRIEF DESCRIPTION OF THE DRAWINGS

FIG. 1 is a perspective view of the present invention;

FIG. 2 is a top plan view of the carrying device without the lid;

FIG. 3 is a side view;

DESCRIPTION OF THE PREFERRED EMBODIMENT

Figure 4:
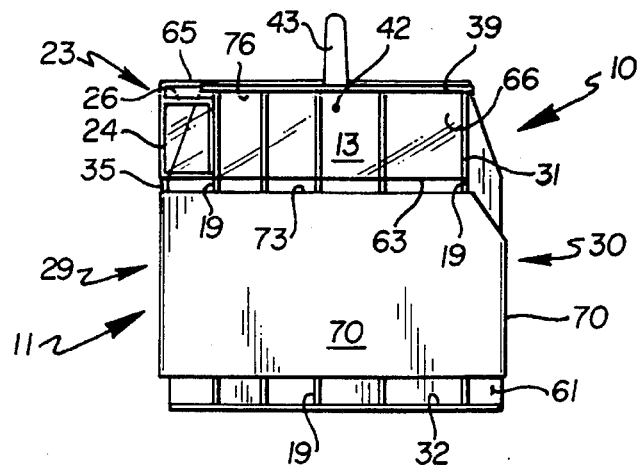
FIG. 4 is an end view.

The compartmentalized fishing tackle storage apparatus of this invention combines the three elements of storage, carrying and easy access into one compact unit that alone performs the same functions as that of two or three typical fishing tackle boxes currently being marketed.

Referring to FIG. 1, the preferred form of the carrying device and tackle storage unit 10 for storage and transporting of fishing lures and other fishing amenities has a quadrangular configuration. The tackle storage and carrying unit 10 is preferably molded from a plastic material and is comprised of a compartmentalized base 11 and a lid or cover 12. The entire perimeter of the base unit 11 is partitioned vertically by a plurality of tapered dividers 19 forming compartments or pockets 20 of varying widths and preferred depths ranging from 1¼ to 1½ inches.

The pockets 21 on storage unit side 29, anterior end 27 and posterior end 28, respectively, are adequate in size to accommodate large artificial lures that will hang vertically from a series of hook holes 59 pre-drilled into a horizontal ledge 39 extending from the top edge of a central reservoir 14. Although vertical storage of lures and other accessories is not unique, the use of vented vertical storage pockets 21 and 22 combined with clear covers that will allow the user to view their equipment and also allow the equipment to dry quickly is unique. The vertical orientation of tackle and lures hung from hook holes 59 will also result in less tangling of equipment.

The carrying and storage unit 10 is carried by means of a stationary handle 43 that projects vertically from the floor 32 of the compartmentalized base 11 through a rectangular opening 44 in the cover or lid 12. The tapered handle 43 is preferably formed of molded plastic and is approximately 12¾ inches high by four inches wide by one inch deep and extends approximately 2¼ inches above the top edge 71 of the base unit 11.

Figure 5:
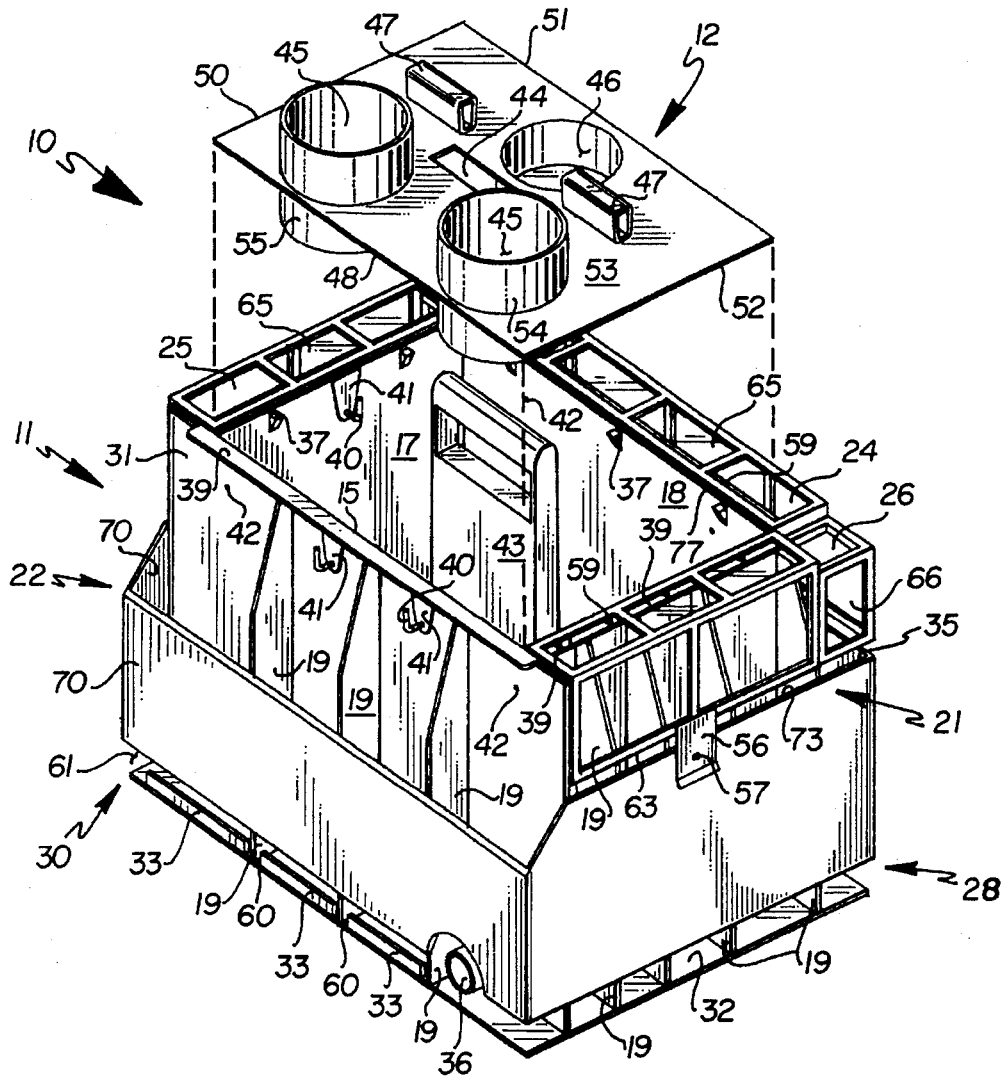
FIG. 5 is a perspective view of the present invention with the cover exploded away from the compartmentalized base exposing the interior of the central reservoir.

The storage and carrying device 10 is generally carded with side 30 held against the users body. The interior or fight-angled wall 31 on side 30 of the base unit 11, as shown in FIG. 5, comprises one side wall of the central reservoir 14. The wall 31 effectively prevents movement or swinging of lures or hooks in the direction of the user and, therefore, helps protect the user from possible injury inflicted by barbed hooks.

Figure 7:
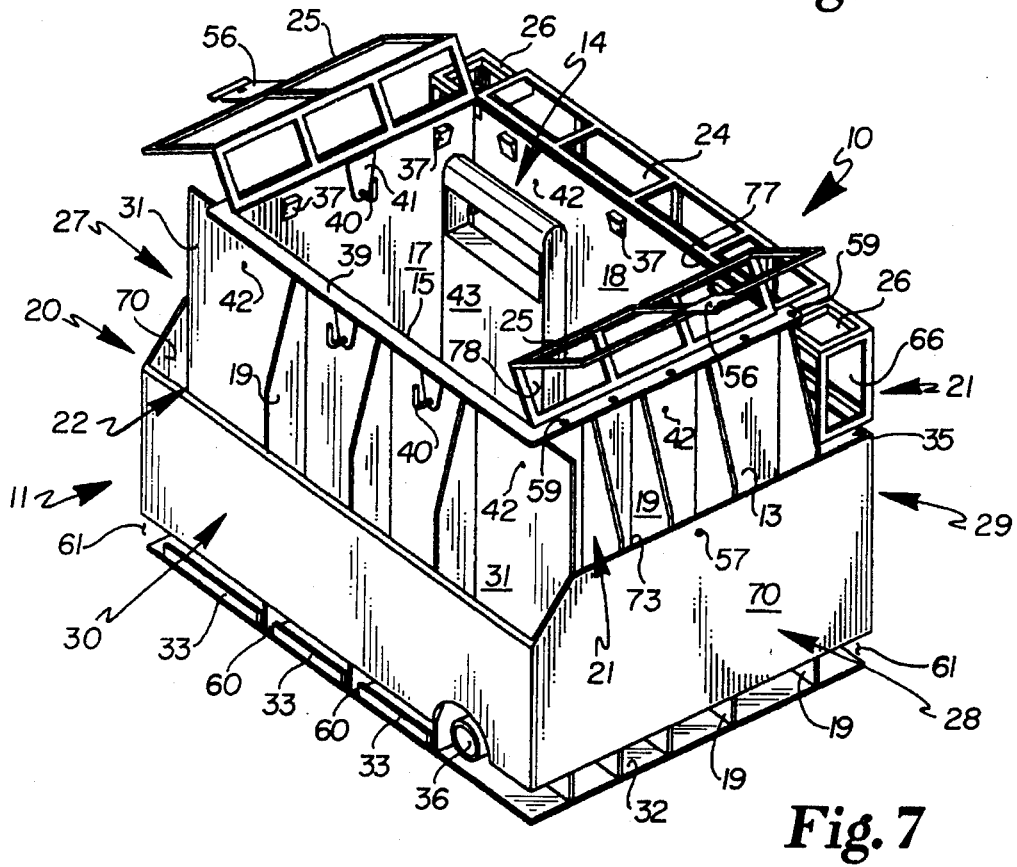
FIG. 7 is a perspective view from the posterior end of the invention, without the lid, showing the interchangeable end hoods in their open positions.

The large, quadrangular central reservoir 14 is formed by abutted continuous inner wall 13, wall 31 and the floor 32 of the base unit 11. The central reservoir 14, as best shown in FIGS. 5 and 7, is approximately 12 inches long by 8 inches wide by 10⅝ inches deep. The central reservoir 14 is suitable for transporting and storing beverage containers, ice and/or live bait. Any contents placed in reservoir 14 can be secured by placing the lid 12 on top of the reservoir 14. Referring to FIGS. 2 and 5, a series of protruding lid stops 37 are evenly spaced and located near the top edge 71 of central reservoir walls 15, 16, 17, and 18 to support the lid 12 when it is placed over the central reservoir 14. Referring to FIGS. 3, 5, and 7, a one inch drain hole 36 located near the floor 32 of the central reservoir 14 permits liquid and/or minnows to be drained out of the central reservoir 14 without the user having to tip the unit and disturb the stored fishing amenities.

As shown in FIGS. 1, 5, 6, and 7, covers or hoods 23, preferably formed of a clear plastic material, are attached to either the anterior end 27, posterior end 28, respectively, and to side 29 of the compartmentalized base 11 by means of a commonly used half-hinge 58. The bottom edge 63 of hoods 23 is elevated about ¼ inch from the top edge 73 of wall 70 creating an open space 35. The open space 35 facilitates air-flow through the compartments 21 and 22, respectively.

Figure 6:
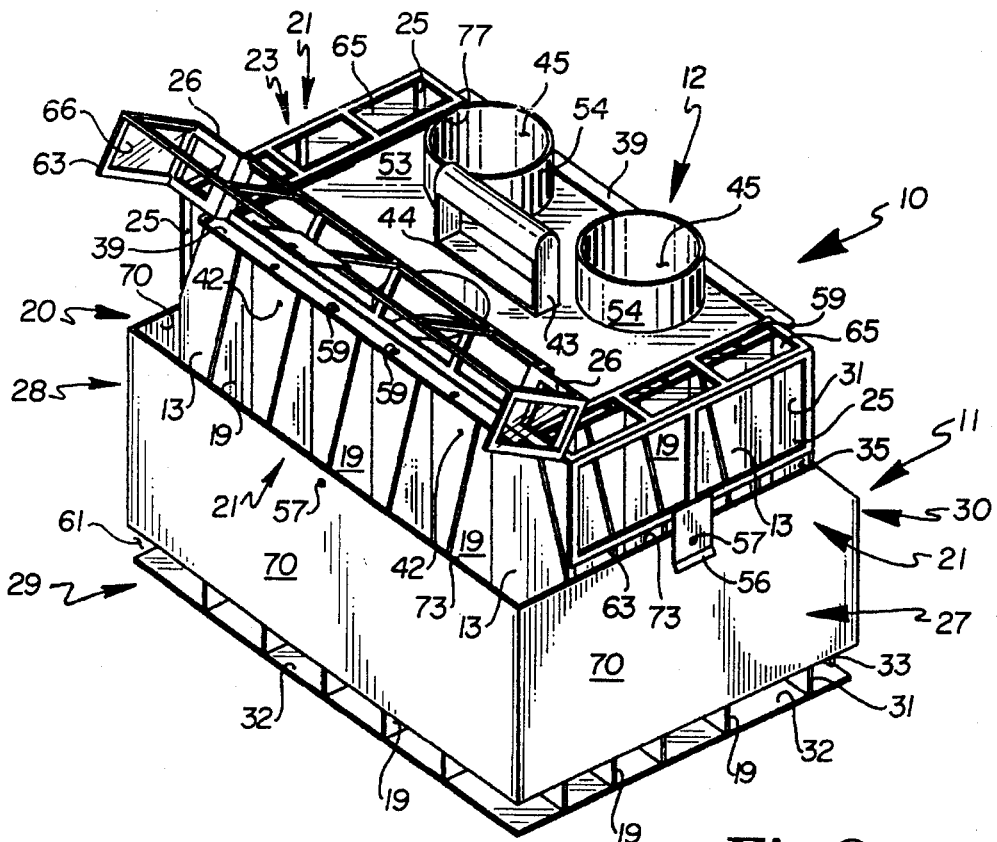
FIG. 6 is a perspective view of the invention from the anterior end showing the long hinged hood in its opened position.

A benefit of the plastic hoods 23 is that, when the hoods 23 are placed in the down or closed position over pockets 21, they protect the user from possible injury that could result from movement or dislocation of articles or lures. Additionally, the hinged clear plastic covers 23 permit easy viewing of the users fishing accessories even when the hoods 23 are in their closed and latched position. When the hoods 23 are in their full open position, as is best shown in FIGS. 6 and 7, the user can easily access any stored lures or accessories.

FIG. 2 shows the top view of the rectilinear base unit 11 of the storage and carrying device 10. The base 11 is approximately 15½ inches long by approximately 11¼ inches wide. A continuous ledge 39 extending horizontally from the top edge 71 of the central reservoir 14 protrudes over the compartments 21 and 22 located below. A series of fourteen pre-drilled holes 59, one hole 59 centered over each compartment 21 on ends 27 and 28, respectively, and on side 29 of the unit 11, accept fishing lures and tackle hooks.

The compartments 22 on side 30, as shown in FIG. 3, are suitable for storage of pliers, sunscreen, sunglasses, etc. A small vertical lip 33 projecting vertically from the floor 32 and centrally located at the bottom of each pocket 22 on side 30 prevents stored articles from sliding out of the pockets or compartments 22. An open space 60 on either end of the vertical lip 33 allows water to escape from the compartments 22 on side 30 without the user having to tip or tilt the base unit 11.

A series of four pre-drilled holes 42 are centrally located near the top edge of wall 31 on side 30 in each of the four compartments. The holes 42 accept a plastic hook 40 that can be utilized to hang various accessories on. The hooks 40 are secured by means a plastic nut turned onto the threaded shaft of hook 40. This hook system allows the user to move the plastic hooks 40 to the users preferred location in any of the compartments 21 or 22. The top edge 74 of the hook back plate 41 abuts with the underside 76 of the ledge 39 to prevent the hook from swiveling. The plastic hooks 40 are compatible with current packaging trends.

Either end of the storage and carrying unit 10 shown in FIG. 4, being identical, is approximately 10⅝ inches high and 11¼ inches wide. The anterior end 27 and posterior end 28 are each divided into four compartments 21 by a series of tapered vertical dividers 19 abutted against a inner wall 13 and surrounded by the elevated outer wall 70.

An air-flow space 61 at the bottom of each compartment 21 and 22, as shown in FIGS. 1, 3, 4, 5, 6, and 7, an air-flow space 35 that is created between the top edge 73 of wall 70 and the bottom edge 63 of hoods 23, as shown in FIGS. 1, and 5-7, and an air-flow space 77 existing between the lower edge of the hinged, vertical back wall 64 of hoods 23 and the horizontal ledge 39, as shown in FIG. 6, facilitate air-flow from the bottom to the top of each compartment 21.

One pre-drilled hole 42 is centrally located on either base unit end 27 or 28, respectively. A plastic hook 40 can be attached to either the interior, as is best shown in FIG. 5, or to the exterior of the wall 13 and secured in place with a plastic nut.

FIG. 5 shows the lid or cover 12, preferably made from a plastic material, that is 8 inches by 12 inches by ⅛ inch thick and fits inside of the central reservoir 14. The lid 12 is supported in place by a series of protruding stops 37 spaced around the top edge 38 of the interior perimeter of the central reservoir 14. The vertically oriented handle 43 projects up through a 4 1/16 inch by 3/4 inch handle opening 44 in the cover 12. This procedure secures the lid or cover 12 on to the base unit 11 while the unit is being transported or while the boat is traveling at high speeds that could result in airfoil conditions. The lid 12 can, however, be easily moved on to or off from the storage and carrying unit 11 by means of a pair of small lid handles 47. The handles 47 are two inch by one inch and are tapered. Reservoirs 45 and 46 on top of lid 12 can be utilized for temporary storage of beverage containers or other small items.

Reservoir 46, suitable for holding small items such as sinkers, small hooks, and other small items, is centrally located between the two lid handles 47, the handle slot 44 and the lid edge 51. The reservoir 46 is recessed one and one-half inches. The two walled beverage reservoirs 45, which can also be used to hold various other items, are each recessed one and one-half inches below the surface of the lid 12. The recessed reservoirs create a three-point base which allows the lid 12 to remain stable or level when it is removed from the base 11 and placed on a flat surface.

The preferred orientation of the lid 12 on the compartmentalized storage and carrying unit 11 is with lid edge 49 abutting against the interior surface 15 of wall 31. This alignment permits the user to raise the short covers or hoods 25 on either box end 27 or 28 to access stored equipment while the beverage reservoirs 45 are in use.

Referring generally to FIGS. 6 and 7, the hood 25 at either anterior end 27 or posterior end 28 of the storage and carrying unit 10 are opened or closed by means of a commonly used half-hinge 58, and are interchangeable from end to end of the base unit 11. The half hinge 58 allows the user to quickly snap the hood 25 into pre-formed slots 79 on the horizontal ledge 39. A one-quarter inch air space 34 exists between the underside 78 of the closed hoods 23 and the continuous ledge 39 extending horizontally from the top edge of base unit 11. This space allows for placement of hooks or other fishing lures into a series of hook holes 59 pre-drilled into the horizontal ledge 39.

The corner sections 26 of the long hood 24 that is attached to side 29 of the base unit 11 are recessed to allow the hood to be fully opened. The hoods 23 are held closed by means of a tab 56. The tabs 56 have a pre-drilled hole that fits over a peg 57 that protrudes from the outer wall 70. Compression tension holds the tab 56 onto the peg 57. The tabs 56 are centrally positioned on the bottom edge 63 of each hood 23.

The invention claimed is:

1. A fishing tackle storage and carrying apparatus, comprising:

(a) a unitary, rectilinear body having a bottom wall and a plurality of interconnected side walls connected to and extending vertically from said bottom wall, said side walls defining an interior reservoir bounded by said bottom wall and said side walls; and (b) a plurality of compartments disposed outside said body, said compartments being formed by an outer wall disposed a predetermined distance from at least one of said side walls and a plurality of divider walls connected to and extending between said at least one side wall and said outer wall, said divider walls being spaced parallel a predetermined distance from each other, each said compartment having an open top end for ingress and egress of fishing tackle thereinto, each said compartment further being open at a bottom end thereof to permit drying of the fishing tackle disposed therein by draining of water and substantial flow of air therethrough.

2. The fishing tackle storage and carrying apparatus of claim 1, wherein said body has an open top.

3. The fishing tackle storage and carrying apparatus of claim 2, further comprising a handle member connected to said bottom wall and extending vertically to a point above said open top.

4. The fishing tackle storage and carrying apparatus of claim 2, wherein said apparatus further comprises a cover member which is removably disposed over said open top, said cover member being detached from said body and further being supported by a plurality of supports when disposed over said open top, said supports being disposed interiorly on said side walls.

5. The fishing tackle storage and carrying apparatus of claim 4, wherein said cover member has to least one sleeved ingress/egress aperture and at least one sleeved container holder disposed therein, said sleeved aperture and container holder providing bottom support for said cover member when placed on a flat surface apart from said apparatus.

6. The fishing tackle storage and carrying apparatus of claim 1, wherein said body is quadrilaterally shaped.

7. The fishing tackle storage and carrying apparatus of claim 2, wherein said body bottom wall has a perimeter dimension which is greater than any horizontal perimeter dimension of said interior reservoir.

8. The fishing tackle storage and carrying apparatus of claim 1, further comprising a drain outlet disposed on one said side wall near said bottom wall, said drain outlet having a closure member adapted for attachment and detachment to said drain outlet, to permit capture and egress of fluid contained in said body interior reservoir.

9. The fishing tackle storage and carrying apparatus of claim 1, further comprising at least one lid member connected to said body and disposed to selectively cover and expose said open top end of each compartment.

10. The fishing tackle and carrying apparatus of claim 9, wherein said at least one lid member is attached to said body by at least one hinge member.

11. The fishing tackle storage and carrying apparatus of claim 9, wherein said at least one lid member is constructed of clear plastic to permit viewing of contents of said compartments.

12. The fishing tackle storage and carrying apparatus of claim 11, wherein said at least one lid member has reinforcing ribs at predetermined areas.

13. The fishing tackle storage and carrying apparatus of claim 1, further comprising at least one hanger hook adapted for movable connection to a top end of said at least one side wall, said hanger hook permitting orientation inwardly or outwardly with respect to said body.

14. A fishing tackle storage and carrying apparatus, comprising:

(a) a unitary, rectilinear body having a bottom wall and a plurality of interconnected side walls connected to and extending vertically from said bottom wall, said side walls defining an interior reservoir bounded by said bottom wall and said side walls, said body having an open top;

(b) a handle member connected to said bottom wall and extending vertically to a point above said open top, and (c) a plurality of compartments disposed outside said body, said compartments being formed by an outer wall disposed a predetermined distance from at least one of said side walls and a plurality of divider walls connected to and extending between said at least one said side wall and said outer wall, said divider walls being spaced parallel a predetermined distance from each other, each said compartment being open at a top end thereof for ingrees and egress of fishing tackle thereinto, each said compartment further being open at a bottom end thereof to permit drying of the fishing tackle disposed therein by draining of water and substantial flow of air therethrough.

15. A fishing tackle storage and carrying apparatus, comprising:

(a) a unitary, rectilinear body having a bottom wall and a plurality of interconnected side walls connected to and extending vertically from said bottom wall, said side walls defining an interior reservoir bounded by said bottom wall and said side walls, said body having an open top, said body further having a quadrilateral shape wherein said bottom wall has a perimeter dimension which is greater than any horizontal perimeter dimension of said interior reservoir, said body further comprising a drain outlet disposed on one said side wall near said bottom walk said drain outlet having a closure member adapted for attachment and detachment to said drain outlet, to permit capture and egress of fluid contained in said body interior reservoir;

(b) a handle member connected to said bottom wall and extending vertically to a point above said open top, (c) a cover member which is removably disposed over said open top, said cover member being detached from said body and further being supported by a plurality of supports when disposed over said open top, said supports being disposed interiorly on said side walls;

(d) a plurality of compartments disposed outside said body, said compartments being formed by an outer wall disposed a predetermined distance from at least one of said side walls and a plurality of divider walls connected to and extending between said at least one side wall and said outer wall, said divider walls being spaced parallel a predetermined distance from each other, each said compartment being open at a top end thereof for ingress and egress of fishing tackle thereinto, each said compartment further being open at a bottom end thereof to permit drying of the fishing tackle disposed therein by draining of water and flow of air therethrough;

(e) at least one lid member connected to said body and disposed to selectively cover and expose said open top end of each compartment and (f) at least one hanger hook for engaging fishing tackle, said hanger hook being adapted for movable connection to a top end of said at least one side wall, said hanger hook further being configurable inwardly or outwardly with respect to said body.

* * * * *